UNITED STATES PATENT OFFICE.

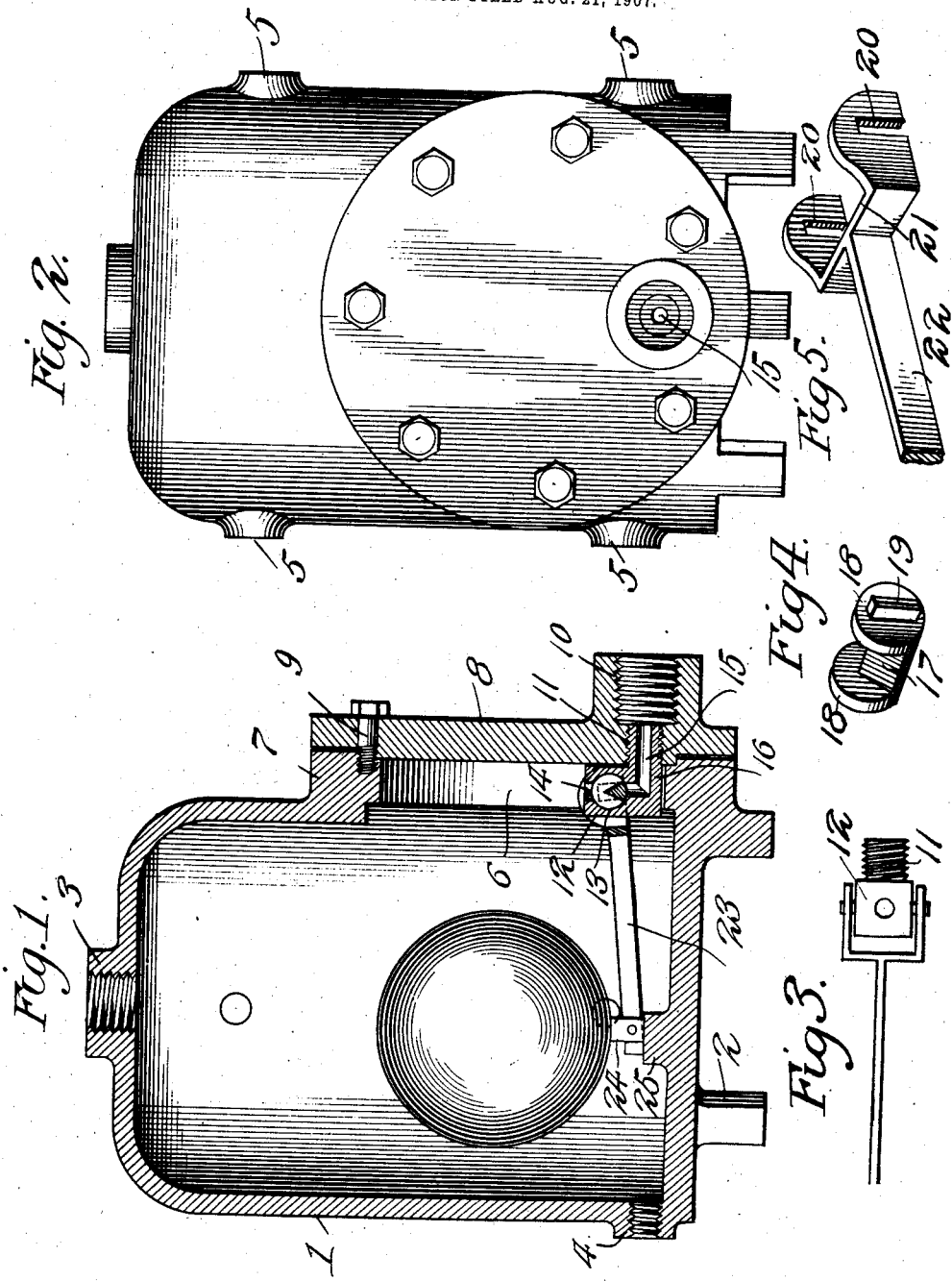

JOHN T. LINDSTROM, OF ALLENTOWN, PENNSYLVANIA.

STEAM-TRAP.

No. 894,021.  Specification of Letters Patent.  Patented July 21, 1908.

Application filed August 21, 1907. Serial No. 389,554.

*To all whom it may concern:*

Be it known that I, JOHN T. LINDSTROM, a citizen of the United States, residing at Allentown, in the county of Lehigh and State of Pennsylvania, have invented new and useful Improvements in Steam-Traps, of which the following is a specification.

This invention relates to improvements in high and low pressure steam traps of the general construction disclosed in my prior patent No. 824,554, wherein the level and discharge of the water of condensation in the trap is governed by a float-controlled outlet valve, the object of the invention being to provide a trap of this character which is simple of construction, comparatively inexpensive of production, entirely automatic in operation and provided with a lid or cover arranged so as to permit of more convenient access to the trap casing for the application and removal of the valve mechanism, cleansing of the parts and making repairs when occasion requires.

A further object of the invention is to provide a novel arrangement of the outlet port and mode of mounting the outlet valve, by which the valve mechanism as a whole may be applied and removed with the lid or cover.

With these and other objects in view, the invention consists of the novel features of construction, combination and arrangement of parts hereinafter fully described and claimed, reference being had to the accompanying drawing, in which:—

Figure 1 is a central vertical section of a steam trap embodying my invention. Fig. 2 is a front elevation of the same. Fig. 3 is plan view of the outlet valve mechanism, omitting the float. Fig. 4 is a perspective view of the outlet valve *per se*. Fig. 5 is a similar view of the forked end of the valve operating arm.

Referring to the drawings, the numeral 1 designates the trap casing, which may be of any suitable size, and is supported upon feet 2 integral with the base thereof, said casing being closed at its top by an integral head formed with a boss 3 internally threaded to receive a suitable inlet connection. The casing is also formed with similar bosses 4 and 5, respectively, for the connection therewith of a blow-off valve and water-gages, which may be of any preferred construction.

Arranged at one side of the casing is an opening or man-hole 6 formed by an external annular wall or flange 7, which opening is closed by a lid or cover 8 through which bolts 9 pass and enter the flange to secure said lid or cover in position, the joint between the casing and cover being ground to make the same air and liquid tight.

The cover is provided at its lower portion with an external boss 10 internally threaded for the reception of an outlet pipe or connection, and formed within the cover and communicating with said boss is a threaded opening 11. A valve seat 12 is supported by the cover and comprises a rectangular block of bronze or other suitable material formed with a transverse opening or valve chamber 13 extending entirely therethrough and communicating at its upper end with a port 14 and at its lower end with a discharge passage 15. The passage 15 extends vertically from the base of the valve chamber in line with the port 14 and thence laterally through a horizontal arm or extension 16 formed upon the base of the valve seat and externally threaded for insertion into the threaded opening 11, whereby the valve seat is connected with and supported by the lid or cover 8. It will be understood that the valve chamber, port and passage may be formed by coring out the seat or by boring or drilling the same, as may be preferred.

Arranged in the valve chamber 13 is an oscillatory outlet valve 17, the main body portion of which is substantially triangular in cross-section as shown and provided with cylindrical end disks or heads 18, forming bearings on which the valve turns within the chamber, said disks being formed with angular lugs 19 projecting beyond the sides of the valve seat. These lugs are adapted to be received in correspondingly shaped openings 20 in the arms of a fork 21 on the end of a valve operating arm or lever 22, to the opposite end of which is connected a float 23 arranged within the casing 1. The float is preferably provided with a short stem 24 pivotally connected with the arm, by which the arm is permitted to move in a determined arc and the float in a vertical plane. As the water rises in the casing, the float moves upward and by means of the arm 23 the valve 17 is partially revolved so as to expose the outlet port or passage 15 and permit the water to exhaust through the port 14, valve chamber 13, passage 15 and the boss 10 to which the outlet pipe or connection is attached. As the water is exhausted, the float descends and again closes the outlet valve, the operation thus being entirely automatic in regulating the level and exhaust of the water. In order to limit the downward movement of the float and maintain the lever arm and valve in the prescribed closing position when the float is lowered, a stop 25 is provided upon the bottom of the casing. This stop is preferably in the form of an upright lug integral with the bottom and arranged to be engaged by the outer end of the arm 23 and the stem 24, forming a firm seat for the lowered arm and float.

It will be seen from the foregoing description that the opening or man-hole 6 is formed in the side of the casing instead of at the top or some other portion thereof and is closed by the detachable lid or cover 8, which may be conveniently removed when occasion requires. This arrangement of the opening permits of the more convenient insertion and removal of the valve mechanism and gives more ready access to the interior of the casing for the purpose of cleansing the same or making repairs. It will also be seen that the discharge port is formed in the lid or cover which carries the valve mechanism in entirety, so that the simple operation of applying and removing the cover results in the simultaneous application and removal of the valve mechanism with obvious advantages.

Having thus described the invention, what I claim as new and desire to secure by Letters Patent is:—

A trap of the character described comprising a casing with an inlet and a side opening, said opening having a surrounding outwardly extended shouldered flange formed on the wall of the casing, a shouldered cover serving to contact with said flange and shoulder of the casing and secured thereto to close the opening, said cover being provided in its lower portion with a screw threaded opening and with an outwardly extended internally screw threaded boss constructed of a size greater than said screw threaded opening and communicating therewith, a valve seat arranged in the lower portion of said flanged opening which consists of a body having a transverse chamber, an inlet port leading thereto, and an outlet port leading therefrom, and also provided with a discharge pipe having an arm extending at right angles thereto through which said outlet port extends, said arm being threaded into said threaded opening of the cover, so as to hold the valve seat in position, a valve mounted in the valve chamber and controlling said ports, an arm connected with the valve, and extending inwardly into the casing, a float carried by the arm, and a stop upon the bottom of the casing arranged in diametrical alinement with the valve seat to support and limit the downward movement of the arm, substantially as specified.

In testimony whereof I affix my signature in presence of two witnesses.

JOHN T. LINDSTROM.

Witnesses:
R. S. LEISENRING,
FRANK ZIMMERMAN.